UNITED STATES PATENT OFFICE.

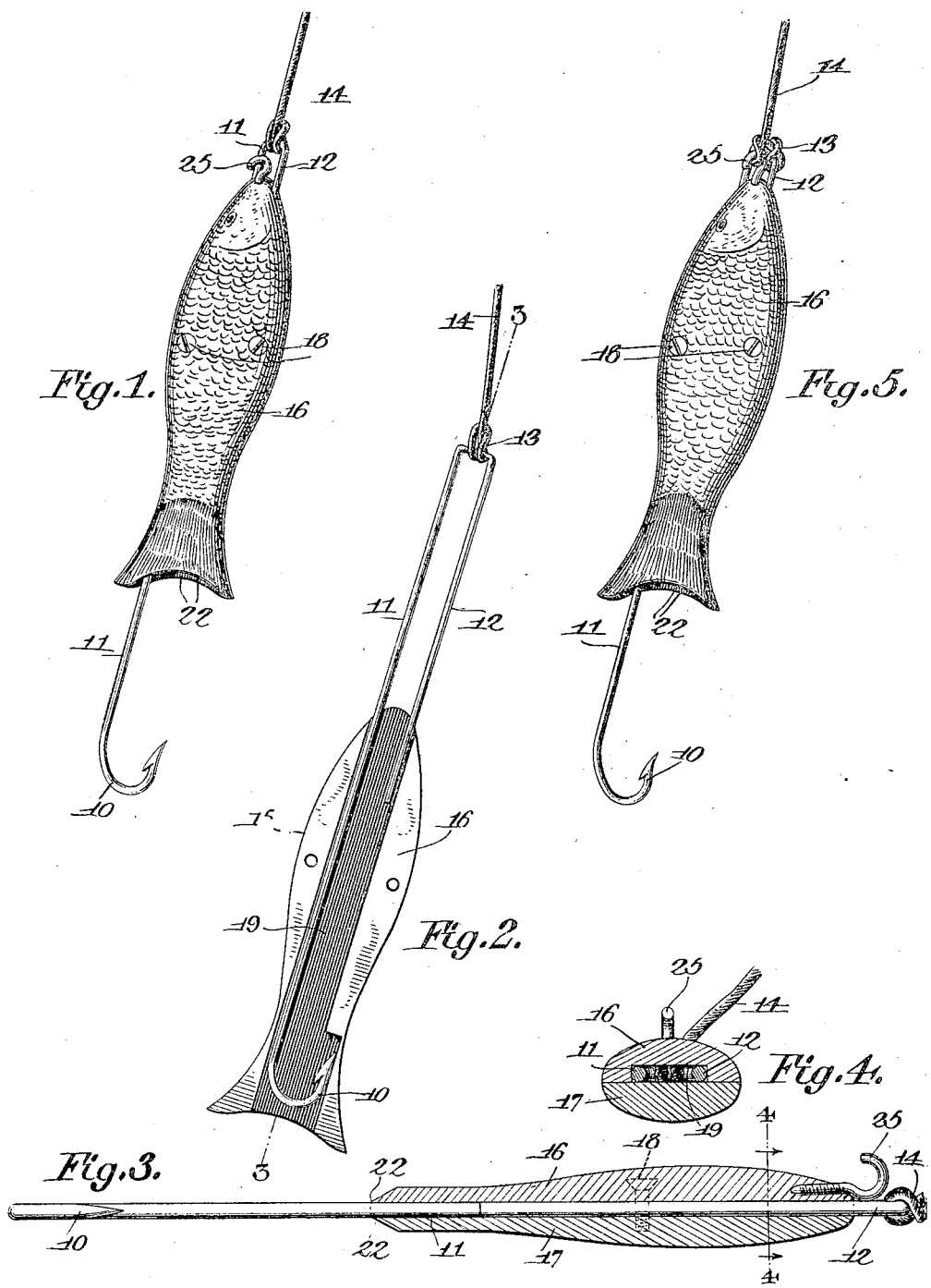

JOSEPH T. HAINES, OF LINWOOD, NEW JERSEY.

FISH-HOOK.

No. 808,285.   Specification of Letters Patent.   Patented Dec. 26, 1905.

Application filed May 8, 1905. Serial No. 259,467.

*To all whom it may concern:*

Be it known that I, JOSEPH T. HAINES, a citizen of the United States, residing at Linwood, in the county of Atlantic and State of New Jersey, have invented a new and useful Fish-Hook, of which the following is a specification.

This invention relates to fish-hooks, and has for its principal objects to provide a hook from which a fish may be detached wthout the necessity of holding the fish in one hand and manipulating the hook with the other in the usual manner.

A further object of the invention is to provide a fish-hook with a cutting member movable over the hook in order to sever any article which may be caught thereon.

A still further object of the invention is to provide a fish-hook with a guard within which the end of the hook may be housed when not in use.

A still further object of the invention is to provide a fish-hook with a guard member having a cutting blade or blades movable past the hook.

A still further object of the invention is to provide a fish-hook with a guard member movable with respect to the shank of the hook and to provide means for preventing independent movement of either the guard or hook.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a perspective view of a fish-hook constructed in accordance with the invention. Fig. 2 is a sectional elevation of the same. Fig. 3 is a longitudinal section of a hook and guard on the line 3 3 of Fig. 2, the guard being drawn up to expose the end of the hook. Fig. 4 is a sectional view of the hook and guard on the line 4 4 of Fig. 3. Fig. 5 is a view similar to Fig. 1, showing the manner in which the hook and its guard are interlocked to prevent independent longitudinal movement of either member.

Similar numerals of reference are employed to indicate corresponding parts throughout the several figures of the drawings.

In carrying out the present invention the hook 10 is provided with an elongated shank 11, that is turned into U-shape form, having an arm 12, that is parallel with the upper end of the shank, the cross-bar 13 between the shank and arm 12 serving as a means for connecting the fishing-line 14.

Surrounding the shank portion of the hooks is a guard 15, that preferably is in the form of a minnow or other small fish generally used for bait, said guard being formed of any suitable material and in the present instance comprising opposite strips or plates 16 and 17, connected by screws or other fastening devices 18. Between the two strips or plates is formed an elongated groove 19, extending for the full length of the guard and forming a guide for the shank of the hook, so that if the fishing-line 14 be detached from the cross-bar 13 the hook and shank will be drawn through the slot and detached from the guard. The lower portion of the slot is of sufficient width to receive the barbed end of the hook, so that the latter may be drawn wholly within the guard and prevent damage to the hook and the catching of its pointed end in the fishing-tackle or clothing. The lower end of the guard is arranged to form two spaced cutting-blades 22, arranged one on each side of the hook, and if a fish is caught on the hook it is merely necessary to catch the line or the cross-bar 13 and then by pushing the guard downward to force the cutting-blades against the head of the fish, cutting the hook out, an operation which may be accomplished very rapidly and without the necessity of handling the fish and bending or otherwise injuring the hook in attempting to extract the same. In practice the guard will be held on the shank portion of the hook with sufficient friction to prevent any loose movement, and after a fish is caught a simple movement of the guard will detach the same.

When trolling for blue fish or other large fish which will bite at the guard, the latter is preferably made to resemble a minnow, and the fishing-line is passed under the hook 25, carried by the guard in the manner shown in Fig. 5, so that independent movement of the guard and hook will be prevented. After a fish is caught the top is detached from the hook 25 and the guard then slid down to cut out the main hook in the manner previously described.

Having thus described the invention, what is claimed is—

1. A fish-hook having a cutting member combined therewith.

2. A fish-hook, and a slidable cutting member combined therewith.

3. A fish-hook having a shank, and a cutting member slidably mounted on said shank.

4. A fish-hook, and a cutting member, one being movable with respect to the other.

5. A fish-hook having a shank, and a slidable member mounted thereon and provided with cutting edges.

6. A fish-hook, and a slidable member mounted thereon, said slidable member having a cutting edge at each side of the hook.

7. A fish-hook and a guard, the two being mounted for slidable movement in the direction of their lengths, said guard having a slot into which the barbed end of the hook may be drawn, and means for locking said guard and hook to prevent independent longitudinal movement of either member.

8. A fish-hook having a shank and provided with an arm carried by the shank, a slide having a slot through which the shank and arm extend, the end of the slide adjacent to the hook being sharpened to form cutting edges.

9. A fish-hook, and a cutter combined therewith, said cutter being in the form of an artificial bait.

10. A fish-hook, and an artificial bait carried thereby, the bait member having a cutting edge.

11. A fish-hook arranged for attachment to a fishing-line, and a guard having means for engaging the line.

12. A fish-hook having means for attachment to a fishing-line, and a slidable guard having a cutting edge adjacent to the barbed end of the hook and provided at its opposite end with a hook member for engagement with the line.

In testimony that I claim the foregoing as my own I have hereto affixed my signature in the presence of two witnesses.

JOSEPH T. HAINES.

Witnesses:
Mrs. W. R. Fox,
Winfield Haines.